(12) United States Patent
Akiyama

(10) Patent No.: US 10,070,020 B2
(45) Date of Patent: Sep. 4, 2018

(54) ELECTRONIC APPARATUS AND IMAGING APPARATUS HAVING MULTI-POSITION MOVABLE DISPLAY

(71) Applicant: RICOH IMAGING COMPANY, LTD., Tokyo (JP)

(72) Inventor: Kazuhiro Akiyama, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 31 days.

(21) Appl. No.: 15/263,858

(22) Filed: Sep. 13, 2016

(65) Prior Publication Data

US 2017/0078535 A1   Mar. 16, 2017

(30) Foreign Application Priority Data

Sep. 14, 2015  (JP) .................................. 2015-180685
Sep. 29, 2015  (JP) .................................. 2015-190774

(51) Int. Cl.
  *H04N 5/225* (2006.01)
  *G03B 17/02* (2006.01)

(52) U.S. Cl.
  CPC ........... *H04N 5/2251* (2013.01); *G03B 17/02* (2013.01)

(58) Field of Classification Search
  CPC ............. H04N 5/23293; H04N 5/2251; H04N 5/2252; G03B 17/02
  See application file for complete search history.

(56) References Cited

U.S. PATENT DOCUMENTS

2006/0109364 A1*  5/2006  Sun .................... G03B 13/02
                                                    348/333.06
2006/0238661 A1* 10/2006  Oh ...................... F16M 11/18
                                                    348/825
2012/0045196 A1*  2/2012  Takahashi ............ H04N 5/2252
                                                    396/374
2012/0081593 A1*  4/2012  Nakagawa ............. G03B 13/04
                                                    348/333.06
2013/0093946 A1*  4/2013  Nakagawa ........... H04N 5/2252
                                                    348/374

FOREIGN PATENT DOCUMENTS

| JP | 2003-315891 | 11/2003 |
| JP | 2006-314042 | 11/2006 |
| JP | 2009-303104 | 12/2009 |
| JP | 2010-103921 |  5/2010 |

OTHER PUBLICATIONS

U.S. Appl. No. 15/262,286 to Kazuhiro Akiyama, filed Sep. 12, 2016.

* cited by examiner

*Primary Examiner* — Luong T Nguyen
(74) *Attorney, Agent, or Firm* — Greenblum & Bernstein, P.L.C.

(57) ABSTRACT

An electronic apparatus or an imaging apparatus includes a body, and a displayer provided with a display screen, the displayer being supported by the body to be movable relative to the body. The displayer is configured to be selectively set at different positions including a stand-by position and a plurality of tilt positions, at which the display screen tilts in different directions relative to an orientation of the displayer set at the stand-by position. The displayer is configured to be selectively moved directly to the plurality of tilt positions rather than via the stand-by position. A support mechanism including a movable member is also disclosed.

20 Claims, 11 Drawing Sheets

ELECTRONIC APPARATUS AND IMAGING APPARATUS HAVING MULTI-POSITION MOVABLE DISPLAY

BACKGROUND OF THE INVENTION

1. Field of the Invention

The present invention relates to an electronic apparatus and an imaging apparatus, each of which is equipped with a movable display.

2. Description of the Related Art

Imaging apparatuses such as digital still cameras and digital camcorders which are constructed to allow the orientation and the angle of a display (displayer) for displaying images (visual images) to be adjusted relative to a body of the imaging apparatus to enhance the convenience of photographing and handling of the imaging apparatus are known in the art. A hinge mechanism (so-called a variable angle mechanism) which supports the display in a manner to allow the display to rotate about one or more than one axis, and a link mechanism which supports the display by a plurality of links (arms) that are connected via pins are known as support mechanisms for the aforementioned movable (angle-adjustable) type of display. In addition, a support structure for the display like that shown in Japanese Unexamined Patent Publication No. 2009-303104 (Patent Literature 1) in which a concave curved surface and a convex curved surface that are in surface contact with each other to be slidable on each other are formed on a body of the imaging apparatus and the display side, respectively, to allow the display to slide along the concave curved surface and the convex curved surface is also known in the art.

The support mechanism using the conventional hinge mechanism or the conventional link mechanism is limited in flexibility in setting of the orientation of the display. When the hinge mechanism is used, sometimes the position of the display largely deviates with respect to a photographing optical axis upon the display being rotated about the axis (axes), which makes it difficult to control the composition. In close-up (macro) photography in particular, the distance between the display of the imaging apparatus and a photographic object is short, so that even a slight shake or a slight positional deviation of the user or the imaging apparatus exerts a great influence on the composition, which makes it difficult to control the composition by intuition if the deviation in position of the display with respect to a photographing optical axis is great, thus causing stress for the user.

The support mechanism using curved surfaces like that disclosed in Patent Literature 1 is higher in flexibility in setting of the orientation of the display than either of the aforementioned hinge mechanism and the aforementioned link mechanism. However, since the support mechanism disclosed in Patent Literature 1 is constructed so that a guide groove(s) (having a straight line or a cross-shaped profile in a developed view) is formed on one of a concave curved surface and a convex curved surface which are in surface contact with each other, and that a slide pin(s) which is engaged in the guide groove is formed on the other of the concave curved surface and the convex curved surface so that the concave curved surface and the convex curved surface can slide on each other while making the slide pin slide in the guide groove, the moving direction of the display when the tilting direction of the display is changed is restricted. For instance, in the case of the cross-shaped guide groove, when the user desires to change the inclination (orientation) of the display between two adjacent tilting directions of the four tilting directions along the cross-shaped groove, the user is required to first slide the display until the guide pin moves back to the center of the guide groove (the intersection point of the cross-shaped groove) and subsequently slide the display in a different tilting direction (desired tilting direction); hence, it is troublesome to change the orientation of the display, i.e., to change the tilting direction of the display from one tilting direction to another.

Additionally, also in technical fields other than the field of imaging apparatuses, electronic apparatuses equipped with a display which is adjustable in orientation and angle with respect to a main body have similar problems, so that there has been a demand to improve the operability of the display when the orientation thereof is changed while increasing the flexibility in setting the orientation and the angle of the display.

SUMMARY OF THE INVENTION

The present invention has been devised in view of the above described problems, and provides an electronic apparatus and an imaging apparatus which are equipped with a movable display, wherein each of the imaging apparatus and the electronic apparatus has a high degree of flexibility in setting the orientation and the angle of the movable display and is superior in operability of the movable display when the orientation thereof is changed.

According to an aspect of the present invention, an electronic apparatus is provided, including a body, and a displayer provided with a display screen, the displayer being supported by the body to be movable relative to the body. The displayer is configured to be selectively set at different positions including a stand-by position and a plurality of tilt positions, at which the display screen tilts in different directions relative to an orientation of the displayer set at the stand-by position. The displayer is configured to be selectively moved directly to the plurality of tilt positions rather than via the stand-by position.

It is desirable for the display screen of the displayer to be rectangular in shape. The displayer can be tilted in at least a long-side direction and a short-side direction of the rectangular display screen.

The displayer can be tilted in at least three directions.

The displayer can be tilted in the different directions at different angles from the stand-by position.

It is desirable for the body to include an image sensor, wherein the display screen of the displayer is configured to display an image obtained by the image sensor. The displayer can be tilted in the different directions relative to the body while remaining positioned on a line extended from an optical axis of a light bundle incident on the image sensor.

In an embodiment an electronic apparatus is provided, including a body, and a displayer provided with a display screen, the displayer being supported by the body via a support mechanism to be movable relative to the body. The support mechanism is configured to allow the displayer to be selectively set at different positions including a stand-by position and a plurality of tilt positions, at which the display screen tilts in different directions relative to an orientation of the displayer set at the stand-by position. The support mechanism is configured to allow the displayer to be selectively moved directly to the plurality of tilt positions rather than via the stand-by position.

In an embodiment, an imaging apparatus is provided, including a body provided with an image sensor, and a displayer provided with a display screen configured to display an image obtained by the image sensor. The displayer is configured to be selectively set at different positions including: a stand-by position at which the display screen is positioned on an extension line of an optical axis of a light bundle incident on the image sensor and is oriented substantially orthogonal to the optical axis; and a plurality of tilt positions at which the display screen tilts in different directions relative to an orientation of the displayer set at the stand-by position while remaining positioned on the extension line. The displayer can be selectively moved to the plurality of tilt positions rather than via the stand-by position.

It is desirable for the body to include an image sensor, wherein the displayer is supported to be movable in directions toward and away from the body. The displayer is configured to perform, when the displayer is positioned close to the body, a first way of tilting in which the displayer can be tilted relative to the body while rotating about an axis extending in a specific direction substantially orthogonal to the directions. The displayer is configured to perform, when the displayer is at a position spaced apart from the body, a second way of tilting in which the displayer can be tilted relative to the body in any arbitrary tilting direction.

It is desirable for the directions, in which the displayer is movable toward and away from the body, to be parallel with directions along a line extended from an optical axis of a light bundle incident on the image sensor.

It is desirable for the displayer to be configured to be tilted in more than one tilting direction to perform the first way of tilting via a reference angle of the displayer at which a display screen thereof lies substantially orthogonal to an optical axis of a light bundle incident on the image sensor; and the displayer is configured to be directly tilted in different tilting directions to perform the second way of tilting rather than via the reference angle.

It is desirable for the displayer to perform the first way of tilting with a portion of the displayer that is in contact with the body serving as a fulcrum.

It is desirable for the displayer to have a substantially rectangular outer shape. The body includes an abutment portion against which each of four sides of the rectangular displayer can abut. The displayer is configured to be selectively tilted in four directions with the four sides of the rectangular displayer, which can abut against the abutment portion, serving as four fulcrums, respectively, to perform the first way of tilting.

When performing each of the first way of tilting and the second way of tilting, it is desirable for the displayer to substantially remain within a range not protruding from an outer shape of the body as viewed along an optical axis of a light bundle incident on the image sensor.

It is desirable for the displayer to be configured to rotate about an axis extending along the directions when the displayer is at a position spaced apart from the body, in which the displayer is movable toward and away from the body.

It is desirable for the displayer to include a first support stage configured to tilt relative to the body, and a second support stage configured to increase a tilting angle thereof relative to the first support stage in at least one direction.

In another embodiment, a support mechanism is provided, including a movable member, the support mechanism configured to support the movable member in a manner to allow the movable member to move relative to a body, wherein the movable member is supported to be movable in directions toward and away from the body. The movable member is configured to perform, when the movable member is positioned close to the body, a first way of tilting in which the movable member can be tilted relative to the body while rotating about an axis extending in a specific direction substantially orthogonal to the directions. The movable member is configured to perform, when the movable member is spaced apart from the body, a second way of tilting in which the movable member can be tilted relative to the body in any arbitrary tilting direction.

It is desirable for the movable member to be configured to be tilted in more than one tilting direction to perform the first way of tilting via a reference angle. The movable member is configured to be directly tilted in different tilting directions to perform the second way of tilting rather than via the reference angle.

It is desirable for the movable member to perform the first way of tilting with a portion of the movable member that is in contact with the body serving as a fulcrum.

It is desirable for the movable member to have a substantially rectangular outer shape, wherein the body includes an abutment portion against which each of four sides of the rectangular movable member can abut. The movable member is configured to be selectively tilted in four directions with the four sides of the rectangular movable member, which can abut against the abutment portion, serving as four fulcrums, respectively, to perform the first way of tilting.

It is desirable for the movable member to be configured to rotate about an axis extending along the directions when the movable member is at a position spaced apart from the body, in which the movable member is movable toward and away from the body.

It is desirable for the movable member to include a first support stage configured to tilt relative to the body, and a second support stage configured to increase a tilting angle thereof relative to the first support stage in at least one direction.

In an embodiment, a support mechanism is provided, including a movable member, the support mechanism configured to support a movable member in a manner to allow the movable member to move relative to a body. The movable member includes a first support stage configured to tilt relative to the body, and a second support stage configured to increase a tilting angle thereof relative to the first support stage in at least one direction. The support mechanism is configured to change a position of the movable member relative to the body via movements of the first support stage and the second support stage.

It is desirable for the movable member to include a displayer which displays an image in accordance with a signal sent from the body.

According to the present invention, an electronic apparatus and an imaging apparatus, can be achieved, which are equipped with a movable display wherein each of the electronic apparatus and the imaging apparatus has a high degree of flexibility in setting the orientation and the angle of the movable display and is superior in operability of the movable display when the orientation thereof is changed. Similarly, a support mechanism is also achieved, which is equipped with a movable member wherein the support mechanism has a high degree of flexibility in setting the orientation and the angle of the movable member and is superior in operability of the movable member when the orientation thereof is changed.

The present disclosure relates to subject matter contained in Japanese Patent Application Nos. 2015-180685 (filed on Sep. 14, 2015) and 2015-190774 (filed on Sep. 29, 2015) which are expressly incorporated herein by reference in their entireties.

BRIEF DESCRIPTION OF THE DRAWINGS

The invention will be described below in detail with reference to the accompanying drawings, in which.

DESCRIPTION OF THE EMBODIMENT

Figure 1:
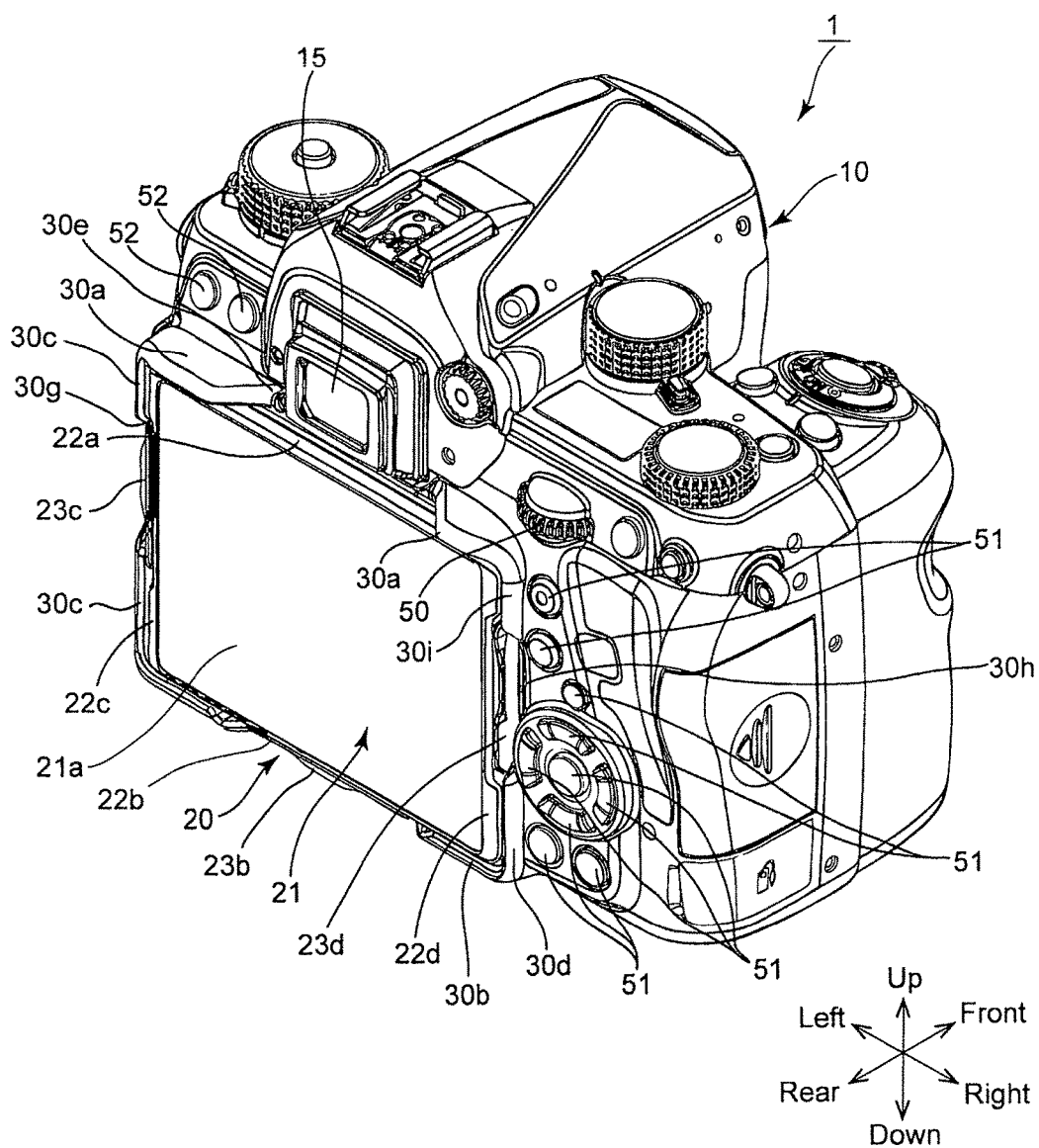
FIG. 1 is a rear perspective view of an embodiment of a lens-interchangeable SLR camera according to the present invention, illustrating the camera in its initial (normal) state, in which a movable monitor (movable displayer) that can be manually tilted is accommodated in a monitor accommodating portion formed in the back of the camera body.

FIGS. 1 through 11 show a camera body 11 of a camera (electronic apparatus/imaging apparatus) 1 according to the present invention. The camera 1 is an interchangeable (lens-interchangeable) SLR camera, to which an interchangeable lens (not shown) is detachably attached. The letter "O" shown in FIG. 11 designates an optical axis of the optical system of the interchangeable lens, through which a light bundle entering the camera body 10 passes. In the following descriptions, forward and rearward directions, leftward and rightward directions and upward and downward directions are determined with reference to the directions of the double-headed arrows shown in the drawings, and the forward direction corresponds to the direction toward the object side. The user is positioned behind the camera 1 in a normal shooting position, so that the upward and downward directions and the leftward and rightward directions are defined as those directions determined by looking from the user's side with the camera body 10 held substantially horizontally.

Figure 11:
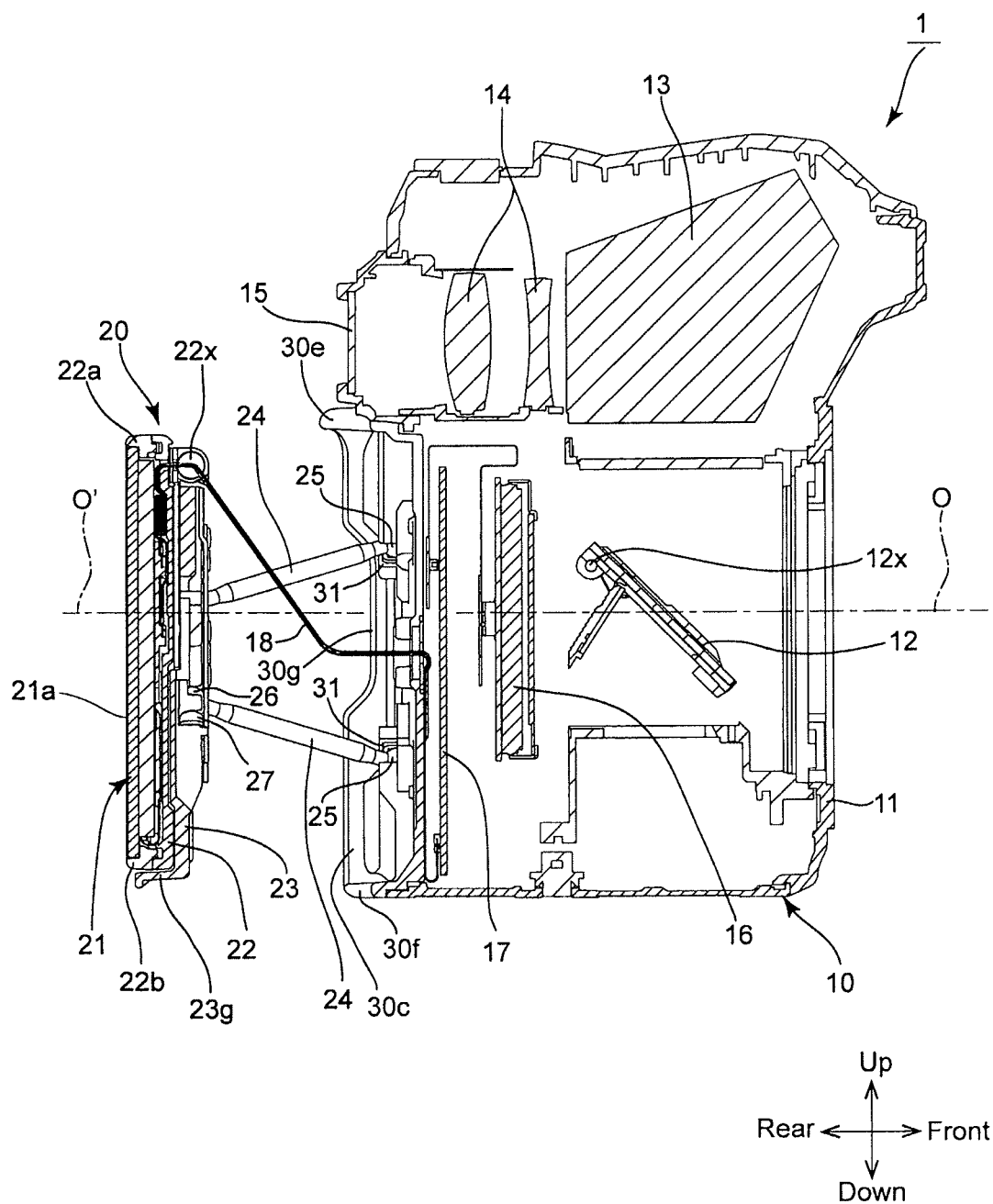
FIG. 11 is a longitudinal sectional view of the camera body and the movable monitor in the state shown in FIG. 7, taken along a plane in which the optical axis lies.

As shown in FIG. 11, the camera body 10 is provided on the front thereof with a lens mount 11 to which an interchangeable lens (not shown) is detachably attached. The camera body 10 is provided thereinside at a position behind the lens mount 11 with a quick-return mirror 12 that is rotatable about a mirror hinge 12x. The quick-return mirror 12 reciprocatively rotates (swings) by a mirror drive mechanism (not shown) between a mirror-down position (the position shown in FIG. 11), in which the quick-return mirror 12 is positioned in a photographing optical path in the camera body 10 to be inclined with respect to the photographing optical path, and a mirror-up position (retracted position), in which the quick-return mirror 12 is retracted upward from the photographing optical path.

When the quick-return mirror 12 is in the mirror-down position, object-emanated light which is passed through the photographing lens system of the interchangeable lens mounted to the lens mount 11 is reflected upward by the quick-return mirror 12 to travel toward a viewfinder optical system provided in the camera body 1. As shown in FIG. 11, this viewfinder optical system is provided with a pentagonal prism 13 which is positioned above the quick-return mirror 12, an eyepiece lens system 14 which is positioned behind the pentagonal prism 13, and an eyepiece window 15 which is positioned behind the eyepiece lens system 14. When the quick-return mirror 12 is in the mirror-down position, an object image can be optically observed through the eyepiece window 15. The camera body 10 is further provided therein, behind the quick-return mirror 12, with an image sensor (image pickup device) 16. When the quick-return mirror 12 rotates to the mirror-up position from the mirror-down position, the object-emanated light which enters the camera body 10 along the optical axis O can be received by the image sensor 16. The camera body 10 is provided between the quick-return mirror 12 and the image sensor 16 with a shutter (focal-plane shutter) (not shown in the drawings), and opening the shutter allows the object-emanated light to reach the light receiving surface of the image sensor 16. The object-emanated light received by the image sensor 16 is photoelectrically converted into an electrical signal to be converted into electronic image data by an image generating circuit. The camera body 10 is provided therein with a body-side circuit board 17 which incorporates this image generating circuit.

The camera body 10 is provided, on the back thereof on the right-hand side of the eyepiece window 15, with a control dial 50. The camera body 10 is provided, on the back thereof below the control dial 50, with a plurality of control buttons 51; and the camera body 10 is further provided, on the back thereof on the left-hand side of the eyepiece window 15, with a plurality of control buttons 52. The control dial 50 is manually rotatable about a shaft (not shown) extending in the upward/downward direction, while each control button 51 and each control button 52 are push-buttons that operate by being manually depressed. Various settings on the camera 1 and capabilities thereof can be selectively performed using the control dial 50 and the control buttons 51 and 52. Such settings and capabilities are well-known, and thus the descriptions thereof are omitted in the following descriptions; however, as an example, aperture values and shutter speeds can be selectively set by rotating the control dial 50. The camera body 10 is further provided with other dials and buttons, e.g., various control dials and buttons provided on top of the camera body 10, etc.; however, the descriptions thereof are also omitted in the following descriptions.

The camera 1 is further provided on the back of the camera body 10 with a movable monitor (displayer/movable member) 20. The movable monitor 20 is positioned below the eyepiece window 15 and the plurality of control buttons 52 and on the left-hand side of the plurality of control buttons 51. The control dial 50 is positioned obliquely above and to the right of the movable monitor 20. The movable monitor 20 is provided with a display 21 such as an LCD (liquid crystal display). The movable monitor 20 is positioned on an extension line of the optical axis O; more specifically, the center of the outer shape of the movable monitor 20 is substantially positioned on an imaginary line O' (see FIG. 11) extended rearward from the optical axis O.

The body-side circuit board 17 and the display 21 are connected via a flexible board 18 (see FIG. 11). Signal communications are performed between the camera body 10 and the movable monitor 20 via the flexible board 18, which makes it possible to visually indicate object images on the display 21 that are based on image data obtained via the image sensor 16 and various information other than images. The movable monitor 20 is supported by the camera body 10 to be movable relative to the camera body 10, thereby allowing the orientation and the position of the display 21 to change. The support mechanism for the movable monitor 20 and operations thereof will be discussed hereinafter. Directions relating to the movable monitor 20 in the following descriptions are those noted when the movable monitor 20 is in the initial position that is shown in FIG. 1 (i.e., in a state where the movable monitor 20 is not either tilted or pulled out with respect to the camera body 10).

The display 21 is fixedly supported on a support frame (second support stage) 22. The display 21 has a display screen (display surface) 21*a* in the shape of a substantially rectangle which faces the user (leftward with respect to FIG. 11). The support frame 22 is provided with an upper side portion 22*a*, a lower side portion 22*b*, a left side portion 22*c* and a right side portion 22*d* which surround the four sides of the rectangular display 21. The display 21 has a rectangular shape elongated in the leftward and rightward directions (laterally-elongated rectangular shape), and the upper side portion 22*a* and the lower side portion 22*b* constitute a pair of long sides of the support frame 22, and the left side portion 22*c* and the right side portion 22*d* constitute a pair of short sides of the support frame 22 to correspond to the shape of the display 21.

The support frame 22 is supported by a base plate (first support stage/base cradle) 23 made of metal. The support frame 22 is rotatable relative to the base plate 23 about pins (a pair of coaxial shafts) 22*x* (see FIGS. 2, 4 and 11) positioned behind (in front of) the upper side portion 22*a*. The axis of the pins 22*x* extend in the leftward and rightward directions, and the support frame 22 can change the orientation thereof in the upward and downward directions by rotating about the pins 22*x* (see FIGS. 5 and 6).

Figure 6:
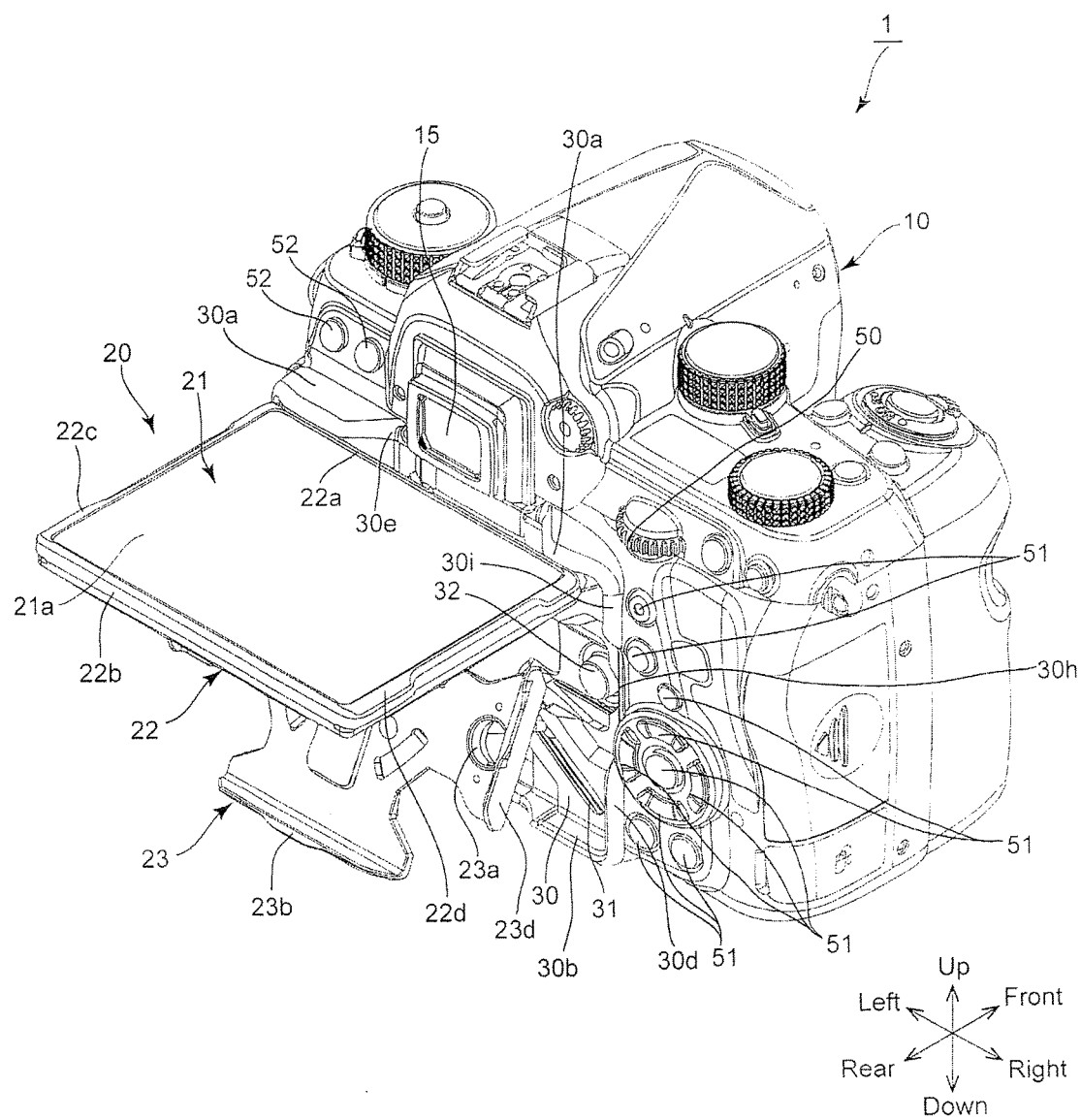
FIG. 6 is a rear perspective view of the SLR camera with the movable monitor tilted further upward.

The base plate 23 is provided, at two different positions in the leftward and rightward directions, with two through-holes 23*a* (only the right through-hole 23*a* is shown in FIG. 6; the left through-hole 23*a* is not shown). The base plate 23 is further provided on the outer edge thereof with flanges 23*b*, 23*c* and 23*d* which are shaped to be capable of being fitted onto the lower side portion 22*b*, the left side portion 22*c* and the right side portion 22*d* of the support frame 22, respectively.

The camera body 10 is provided on the back thereof with a monitor accommodating portion 30 which can accommodate the movable monitor 20. The monitor accommodating portion 30 is formed in the shape of a rectangular recess corresponding to the substantially rectangular outer shape of the movable monitor 20 (i.e., allowing the movable monitor 20 to be fitted into the monitor accommodating portion 30) and is surrounded by an upper edge wall (abutment portion) 30*a*, a lower edge wall (abutment portion) 30*b*, a left edge wall (abutment portion) 30*c* and a right edge wall (abutment portion) 30*d* which are formed on the back of the camera body 10 to project rearward like flanges. Four guide grooves (support mechanism) 31: an upper left guide groove 31, a lower left guide groove 31, an upper right guide groove 31 and a lower right guide groove 31 are formed at the bottom of the monitor accommodating portion 30, into four elongated grooves which extend in four radial directions along the diagonal lines of the substantially rectangular monitor accommodating portion 30. More specifically, the upper left guide groove 31 extends in a direction from a point in the vicinity of the border (corner) between the upper edge wall 30*a* and the left edge wall 30*c* toward the center of the monitor accommodating portion 30 (i.e., toward the imaginary line O'), the lower left guide groove 31 extends in a direction from a point in the vicinity of the border (corner) between the lower edge wall 30*b* and the left edge wall 30*c* toward the center of the monitor accommodating portion 30 (i.e., toward the imaginary line O'), the upper right guide groove 31 extends in a direction from a point in the vicinity of the border (corner) between the upper edge wall 30*a* and the right edge wall 30*d* toward the center of the monitor accommodating portion 30 (i.e., toward the imaginary line O'), and the lower right guide groove 31 extends in a direction from a point in the vicinity of the border (corner) between the lower edge wall 30*b* and the right edge wall 30*d* toward the center of the monitor accommodating portion 30 (i.e., toward the imaginary line O'). The upper left guide groove 31 and the lower right guide groove 31 are positioned on one of the two diagonal lines of the monitor accommodating portion 30. The lower left guide groove 31 and the upper right guide groove 31 are positioned on the other diagonal line of the monitor accommodating portion 30. In each guide groove 31, the end thereof closer to the center of the monitor accommodating portion 30 is referred to as the inner end, and the other end that is farther from the center of the monitor accommodating portion 30 is referred to as the outer end. The inner ends of the four guide grooves 31 are arranged to surround the imaginary line O'. The camera body 10 is further provided, at the bottom of the monitor accommodating portion 30 at two different positions in the leftward and rightward directions, with two positioning projections 32, respectively. The two positioning projections 32 can be fitted into the two through-holes 23*a* that are formed through the base plate 23. A magnet is installed in each positioning protrusion 32.

Each of the upper edge wall 30*a*, the lower edge wall 30*b*, the left edge wall 30*c* and the right edge wall 30*d*, which surround the monitor accommodating portion 30, is not constant in rearwardly projecting amount from the base of the monitor accommodating portion 30; specifically, the upper edge wall 30*a*, the lower edge wall 30*b*, the left edge wall 30*c* and the right edge wall 30*d* are provided at mid-sections thereof with recesses 30*e*, 30*f*, 30*g* and 30*h*, respectively, which are smaller in rearwardly projecting amount from the base of the monitor accommodating portion 30 than the remaining portions of the upper edge wall 30*a*, the lower edge wall 30*b*, the left edge wall 30*c* and the right edge wall 30*d*. The recess 30*e* is formed at a center portion of the upper edge wall 30*a* in the leftward and rightward directions. The formation of the recess 30*e* prevents the upper edge wall 30*a* from interfering with the eyepiece window 15. The recess 30*f* is formed at a center portion of the lower edge wall 30*b* in the leftward and rightward directions and allows the flange 23*b* of the base plate 23 to enter. The recess 30*g* is formed at a center portion of the left edge wall 30*c* in the upward and downward directions and allows the flange 23*c* of the base plate 23 to enter. The recess 30*h* is formed at a center portion of the right edge wall 30*d* in the upward and downward directions and allows the flange 23*d* of the base plate 23 to enter. The upper end of the right edge wall 30*d* that is positioned between the upper edge wall 30*a* and the recess 30*h* is formed as a low wall 30*i* which is small in rearwardly projecting amount and progressively increases in rearwardly projecting amount from the low wall 30i to the upper edge wall 30a.

The movable monitor 20 is connected to the camera body 10 via four support rods (support mechanism) 24. Each support rod 24 is provided at one end and the other end (the outer end and the inner end) thereof with a spherical end 25 and a spherical end 26 (see FIG. 11), respectively. The spherical ends 25 of the four support rods 24 are engaged in the four guide grooves 31, which are formed in the monitor accommodating portion 30, while the spherical ends 26 of the four support rods 24 are engaged in the four sockets (support mechanism) 27, which are provided on the base plate 23. Each of the spherical ends 25 and 26 is a spherical body which is connected to the associated guide groove 31 or socket 27 to be capable of rotating about the spherical center of the spherical body (i.e., to be freely rotatable with no restrictions on rotational direction) to provide a ball joint structure allowing the orientation of each of the camera body 10 and the movable monitor 20 to change relative to the support rods 24 with great flexibility. In addition, each spherical end 25 is engaged in the associated guide groove 31 and supported thereby to be slidably movable in the longitudinal direction of the associated guide groove 31. A total of four support rods 24 and a total of four sockets 27 are provided and arranged at positions corresponding to those of the four guide grooves 31. Specifically, the upper left support rod 24 connects the upper left guide groove 31 with the upper left socket 27, the lower left support rod 24 connects the lower left guide groove 31 with the lower left socket 27, the upper right support rod 24 connects the upper right guide groove 31 with the upper left socket 27, and the lower right support rod 24 connects the lower right guide groove 31 with the lower right socket 27.

Operations of the movable monitor 20, which has the above described support structure, relative to the camera body 10 will be discussed hereinafter. FIG. 1 shows a state where the movable monitor 20 is in the initial position, in which the movable monitor 20 is totally accommodated in the monitor accommodating portion 30 of the camera body 10. When the movable monitor 20 is in the initial position, the two positioning projections 32 are fitted into the two through-holes 23a of the base plate 23, thereby fixing the position of the movable monitor 20. Two magnets respectively installed in the two positioning projections 32 attract the base plate 23 by the magnetic force of the two magnets to hold the movable monitor 20 in the initial position. In addition, the upper side portion 22a, the lower side portion 22b (the flange 23b), the left side portion 22c (the flange 23c) and the right side portion 22d (the flange 23d) of the movable monitor 20 are positioned alongside the upper edge wall 30a, the lower edge wall 30b, the left edge wall 30c and the right edge wall 30d, respectively, which surround the monitor accommodating portion 30. When the movable monitor 20 is in the initial position, the spherical end 25 of each support rod 24 is positioned in the vicinity of the outer end of the associated guide groove 31, and the rising angle (projecting amount) of each support rod 24 relative to the monitor accommodating portion 30 is at a minimum. When the movable monitor 20 is at the initial position, the four sockets 27 and the spherical ends 26 of the four support rods 24 are arranged at positions surrounding the imaginary line O'. The orientation of the movable monitor 20 in the initial position is set so that the display screen 21a of the display 21 is substantially orthogonal to the optical axis O (more specifically, orthogonal to the imaginary line O' that is extended rearward from the optical axis O). The angle of the movable monitor 20 at this orientation is defined as a reference angle of the movable monitor 20.

Figure 2:
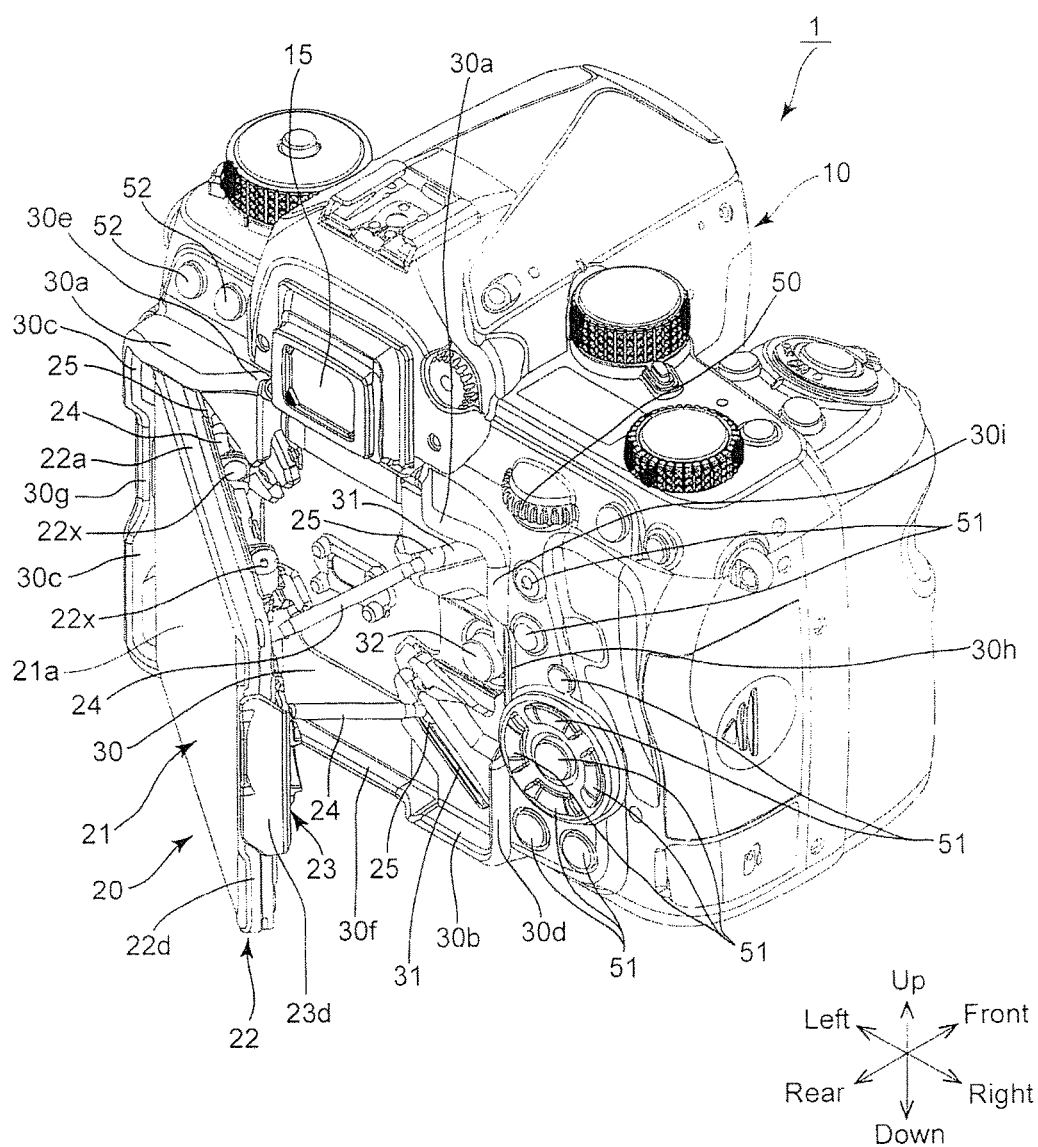
FIG. 2 is a rear perspective view of the SLR camera with the movable monitor tilted leftward.

As shown in FIGS. 2 through 5, the movable monitor 20 can be tilted in four directions horizontally and vertically (in the long-side direction and the short-side direction of the display screen) from the aforementioned reference angle of the movable monitor 20 in the initial position thereof. FIG. 2 shows a state where the movable monitor 20 is tilted leftward about an axis extending in the upward and downward directions. The movable monitor 20 is tilted leftward with the contact portion between the left side portion 22c (the flange 23c) and the left edge wall 30c serving as a fulcrum by pulling the right side portion 22d (the flange 23d) of the movable monitor 20 rearwardly. In this tilting operation, each of the upper right support rod 24 and the lower right support rod 24 increases the rising angle (projecting amount) thereof relative to the monitor accommodating portion 30 while moving the associated spherical end 25 toward the inner end of the associated guide groove 31 from a portion of this guide groove in the vicinity of the outer end thereof, thereby pushing the upper right socket 27 and the lower right socket 27 rearward to tilt the movable monitor 20 leftward. FIG. 2 shows a state where the movable monitor 20 is tilted leftward to a maximum angle by pulling the upper right support rod 24 and the lower right support rod 24. In this state, the spherical ends 25 of the upper right support rod 24 and the lower right support rod 24 are positioned in the vicinity of the inner ends of the associated guide grooves 31.

Figure 3:
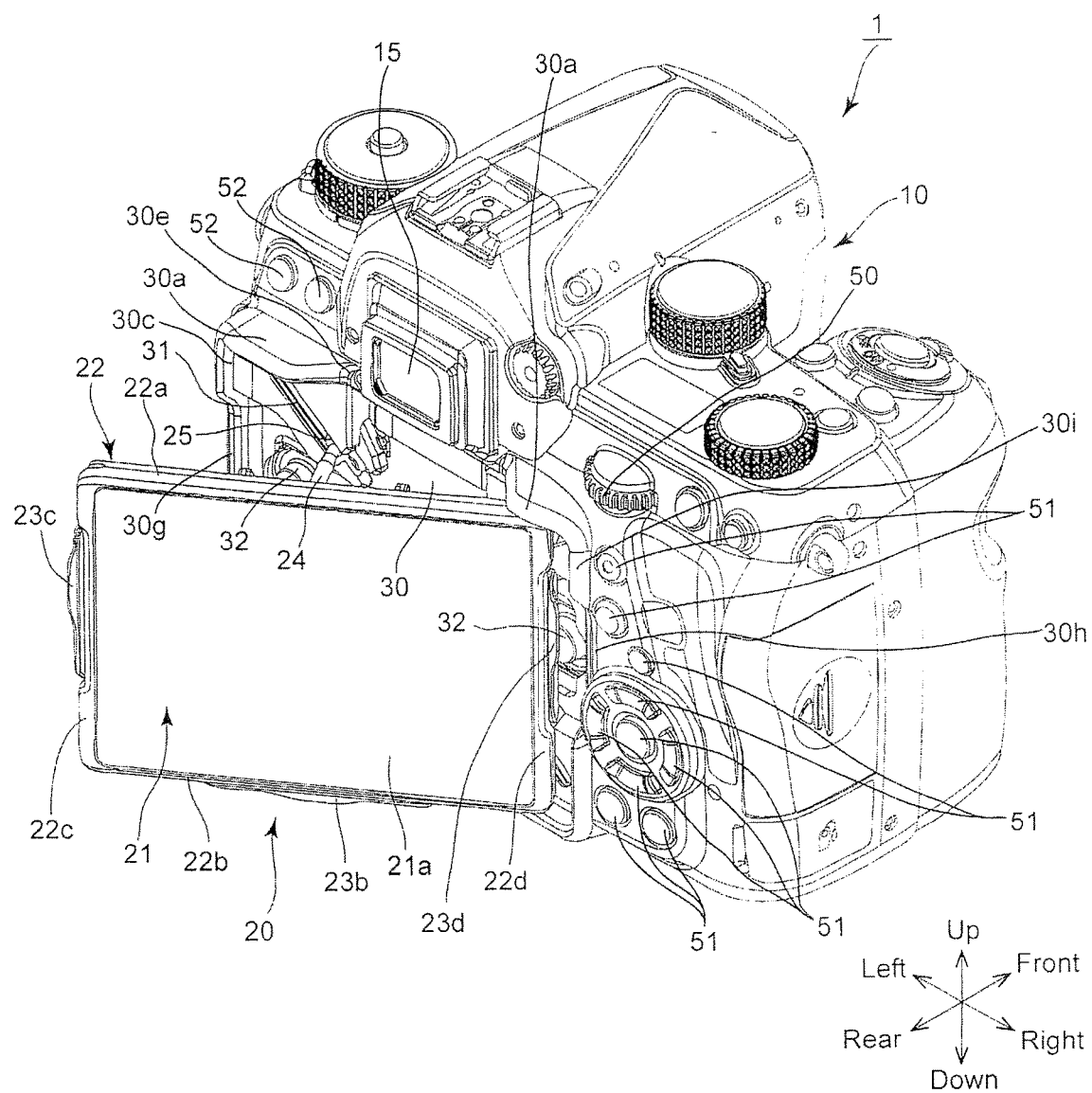
FIG. 3 is a rear perspective view of the SLR camera with the movable monitor tilted rightward.

FIG. 3 shows a state where the movable monitor 20 is tilted rightward about an axis extending in the upward and downward directions. The movable monitor 20 is tilted rightward with the contact portion between the right side portion 22d (the flange 23d) and the right edge wall 30d serving as a fulcrum by pulling the left side portion 22c (the flange 23c) of the movable monitor 20 rearwardly. In this tilting operation, each of the upper left support rod 24 and the lower left support rod 24 increases the rising angle (projecting amount) thereof relative to the monitor accommodating portion 30 while moving the associated spherical end 25 toward the inner end of the associated guide groove 31 from a portion of this guide groove in the vicinity of the outer end thereof, thereby pushing the upper left socket 27 and the lower left socket 27 rearward to tilt the movable monitor 20 rightward. FIG. 3 shows a state where the movable monitor 20 is tilted rightward to a maximum angle by pulling the upper left support rod 24 and the lower left support rod 24. In this state, the spherical ends 25 of the upper left support rod 24 and the lower left support rod 24 are positioned in the vicinity of the inner ends of the associated guide grooves 31.

Figure 4:
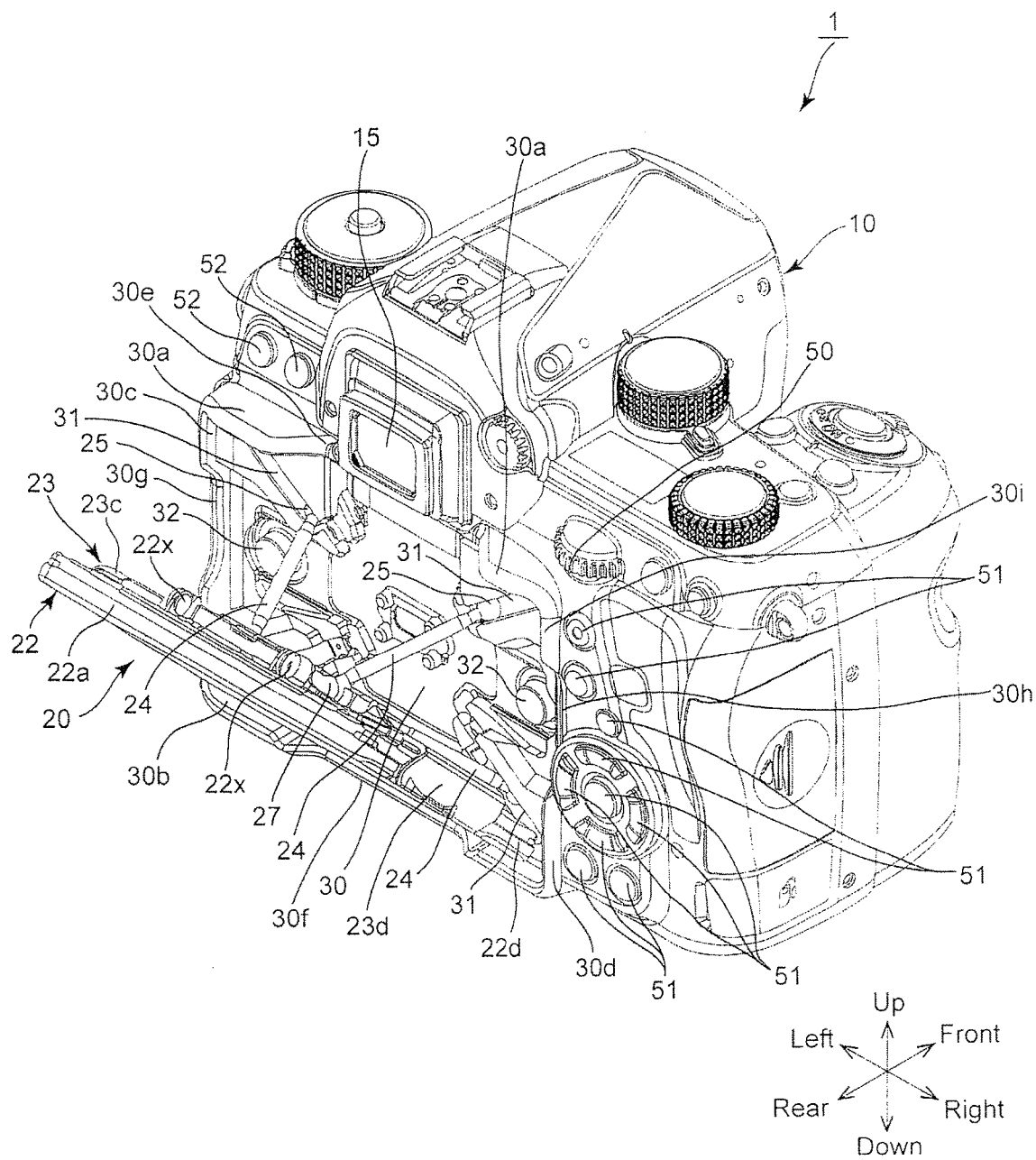
FIG. 4 is a rear perspective view of the SLR camera with the movable monitor tilted downward.

FIG. 4 shows a state where the movable monitor 20 is tilted downward about an axis extending in the leftward and rightward directions. The movable monitor 20 is tilted downward with the contact portion between the lower side portion 22b (the flange 23b) and the lower edge wall 30b serving as a fulcrum by pulling the upper side portion 22a of the movable monitor 20 rearwardly. In this tilting operation, each of the upper left support rod 24 and the upper right support rod 24 increases the rising angle (projecting amount) thereof relative to the monitor accommodating portion 30 while moving the associated spherical end 25 toward the inner end of the associated guide groove 31 from a portion of this guide groove in the vicinity of the outer end thereof, thereby pushing the upper left socket 27 and the upper right socket 27 rearward to tilt the movable monitor 20 downward. FIG. 4 shows a state where the movable monitor 20 is tilted downward to a maximum angle by pulling the upper left support rod 24 and the upper right support rod 24. In this state, the spherical ends 25 of the upper left support rod 24 and the upper right support rod 24 are positioned in the vicinity of the inner ends of the associated guide grooves 31.

Figure 5:
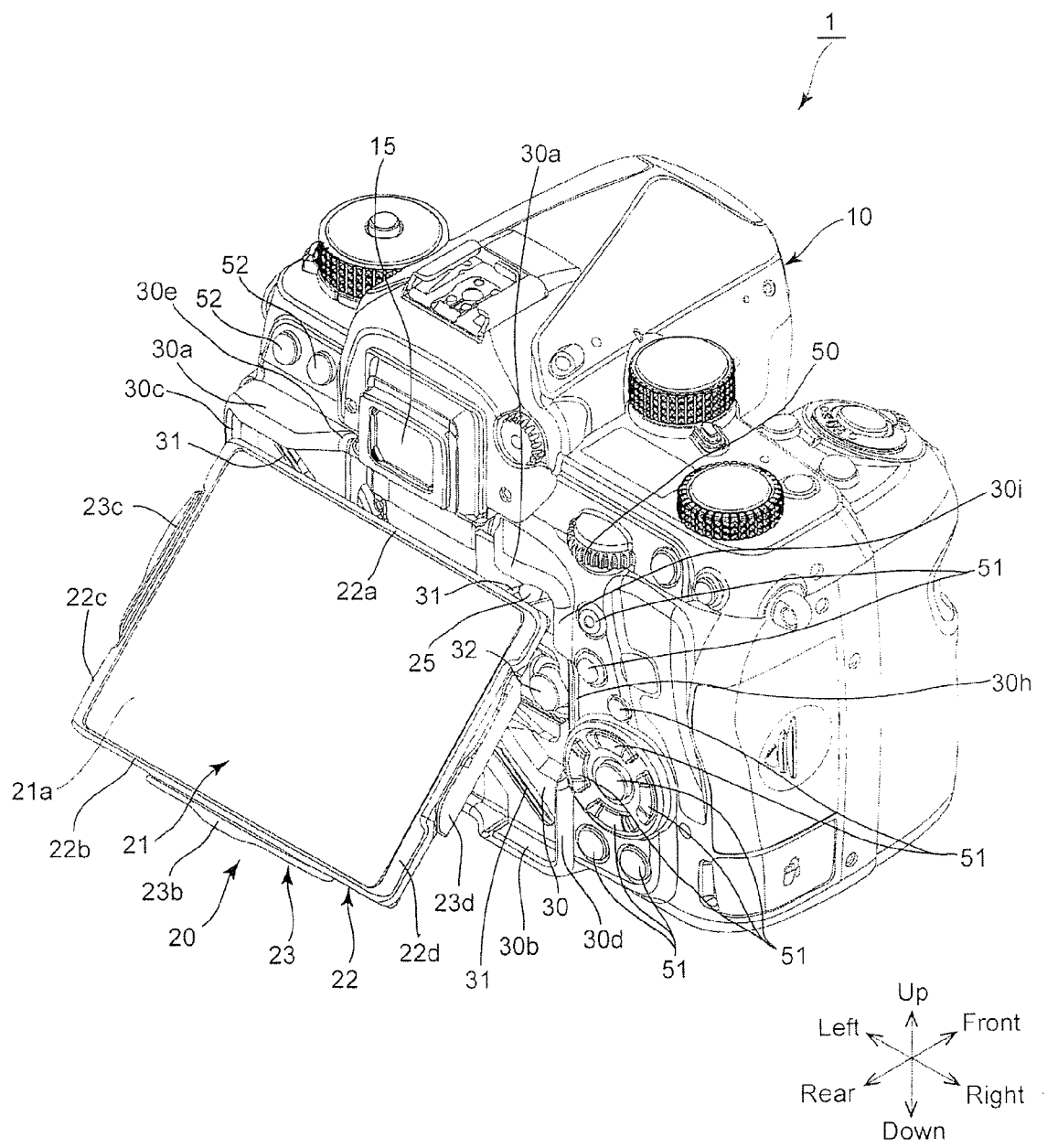
FIG. 5 is a rear perspective view of the SLR camera with the movable monitor tilted upward.

FIG. 5 shows a state where the movable monitor 20 is tilted upward about an axis extending in the leftward and rightward directions. The movable monitor 20 is tilted upward with the contact portion between the upper side portion 22a and the upper edge wall 30a serving as a fulcrum by pulling the lower side portion 22b (the flange 23b) of the movable monitor 20 rearwardly. In this tilting operation, each of the lower left support rod 24 and the lower right support rod 24 increases the rising angle (projecting amount) thereof relative to the monitor accommodating portion 30 while moving the associated spherical end 25 toward the inner end of the associated guide groove 31 from a portion of this guide groove in the vicinity of the outer end thereof, thereby pushing the lower left socket 27 and the lower right socket 27 rearward to tilt the movable monitor 20 upward. FIG. 5 shows a state where the movable monitor 20 is tilted upward to a maximum angle by pulling the lower left support rod 24 and the lower right support rod 24. In this state, the spherical ends 25 of the lower left support rod 24 and the lower right support rod 24 are positioned in the vicinity of the inner ends of the associated guide grooves 31.

When the movable monitor 20 is in the initial position shown in FIG. 1 (i.e., in a state of being accommodated in the monitor accommodating portion 30), the movable monitor 20 is surrounded by the upper edge wall 30a, the lower edge wall 30b, the left edge wall 30c and the right edge wall 30d, which are formed on the periphery of the monitor accommodating portion 30, thereby preventing and protecting the movable monitor 20 from getting externally caught so that the movable monitor 20 is not accidentally moved. The low wall 30i, which is formed at the upper end of the right edge wall 30d (at the border between the right edge wall 30d and the upper edge wall 30a), improves the operability of the control dial 50 (which is positioned to the upper right of the movable monitor 20) and the plurality of control buttons 51, which are positioned below the control button 50. Specifically, when the user holds the grip of the camera body 10 with the right hand, it is assumed that the control dial 50 and the push buttons (including the control buttons 51) provided around the control dial 50 are operated by the thumb of the right hand. In this operation, the low wall 30i sits on the moving path of the thumb of the right hand, which allows this thumb to be capable of reaching the control dial 50 smoothly without getting caught by the relatively high walls (30a, 30b, 30c and 30d) which surround the monitor accommodating portion 30.

When the movable monitor 20 is in the initial position, the movable monitor 20 can be protected by the upper edge wall 30a, the lower edge wall 30b, the left edge wall 30c and the right edge wall 30d, which are provided at positions surrounding the four corners (the upper left corner, the upper right corner, the lower left corner and the lower right corner) of the movable monitor 20 as described above. On the other hand, the rim of the movable monitor 20 is partly exposed by the formation of the recesses 30e, 30f, 30g and 30h on the periphery of the monitor accommodating portion 30 to thereby achieve an easier operability of the movable monitor 20 (making it easier to grip the movable monitor 20 with fingers) from the initial position thereof when the movable monitor 20 is tilted from the initial position as shown in FIGS. 2 through 5. Since the recesses 30e, 30f, 30g and 30h are formed to correspond to the center portions of the associated side portions 22a, 22b, 22c and 22d, respectively, of the movable monitor 20, it is easy to apply a manual force on the movable monitor 20 to tilt the movable monitor 20 in any of the upward, downward, leftward and rightward directions from the initial position.

Although FIGS. 2 through 5 each show a state where the movable monitor 20 (together with the base plate 23) is tilted upward, downward, leftward or rightward to a maximum angle by manually moving the movable monitor 20 while moving the four support rods 24, it is also possible to hold the movable monitor 20 at any arbitrary angle smaller than the maximum angle by positioning the spherical end 25 of each of at least two of the four support rods 24 at an intermediate position between the inner end and the outer end of the associated guide groove 31. The spherical end 25 of each support rod 24 is engaged in the associated guide groove 31 with a predetermined degree of friction applied thereto, and the movable monitor 20 can be held at the aforementioned arbitrary angle by stopping the tilting operation of the movable monitor 20 on its way to the maximum angle. The maximum tilt angles of the movable monitor 20 in the leftward, rightward, downward and upward directions can be modified to angles greater or smaller than the angles of the movable monitor 20 shown in FIGS. 2 through 5, respectively, by changing the settings such as the lengths of the support rods 24 and the lengths of the guide grooves 31.

The upward angle of the movable monitor 20 can further be increased by rotating the support frame 22 about the pins 22x relative to the base plate 23 as shown in FIG. 6. For instance, in the state shown in FIG. 5, the entire movable monitor 20 is angled (rotated) upward at approximately 40 degrees relative to the camera body 10 by the aforementioned tilting operation (first-stage tilting operation) that is performed via the four support rods 24. Additionally, in the state shown in FIG. 6, each of the display 21 and the support frame 22, which are fixed to each other, has been angled upward at approximately 90 degrees relative to the initial position that is shown in FIG. 1 by an additional tilting operation of the support frame 22 with respect to the base plate 23 (second-stage tilting operation). This second-stage tilting operation makes it possible to use the movable monitor 20 as like a waist-level finder. The rotation of the support frame 22 from the state shown in FIG. 5 to the state shown in FIG. 6 can be carried out manually with fingers placed on portions of the support frame 22 which are not covered by the flanges 23b, 23c and 23d of the base plate 23.

Figure 7:
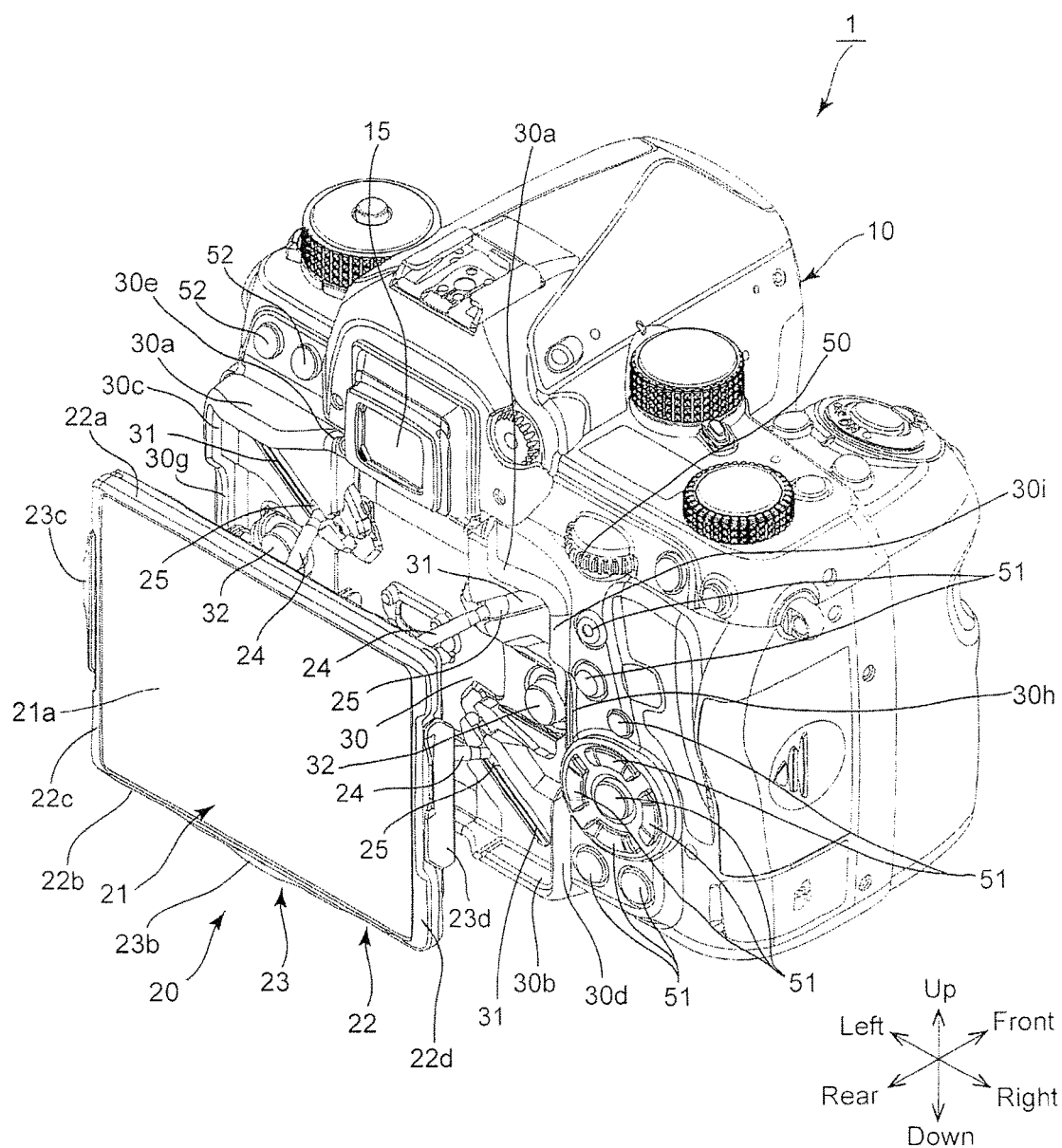
FIG. 7 is a rear perspective view of the SLR camera with the movable monitor pulled out rearwardly.
Figure 8:
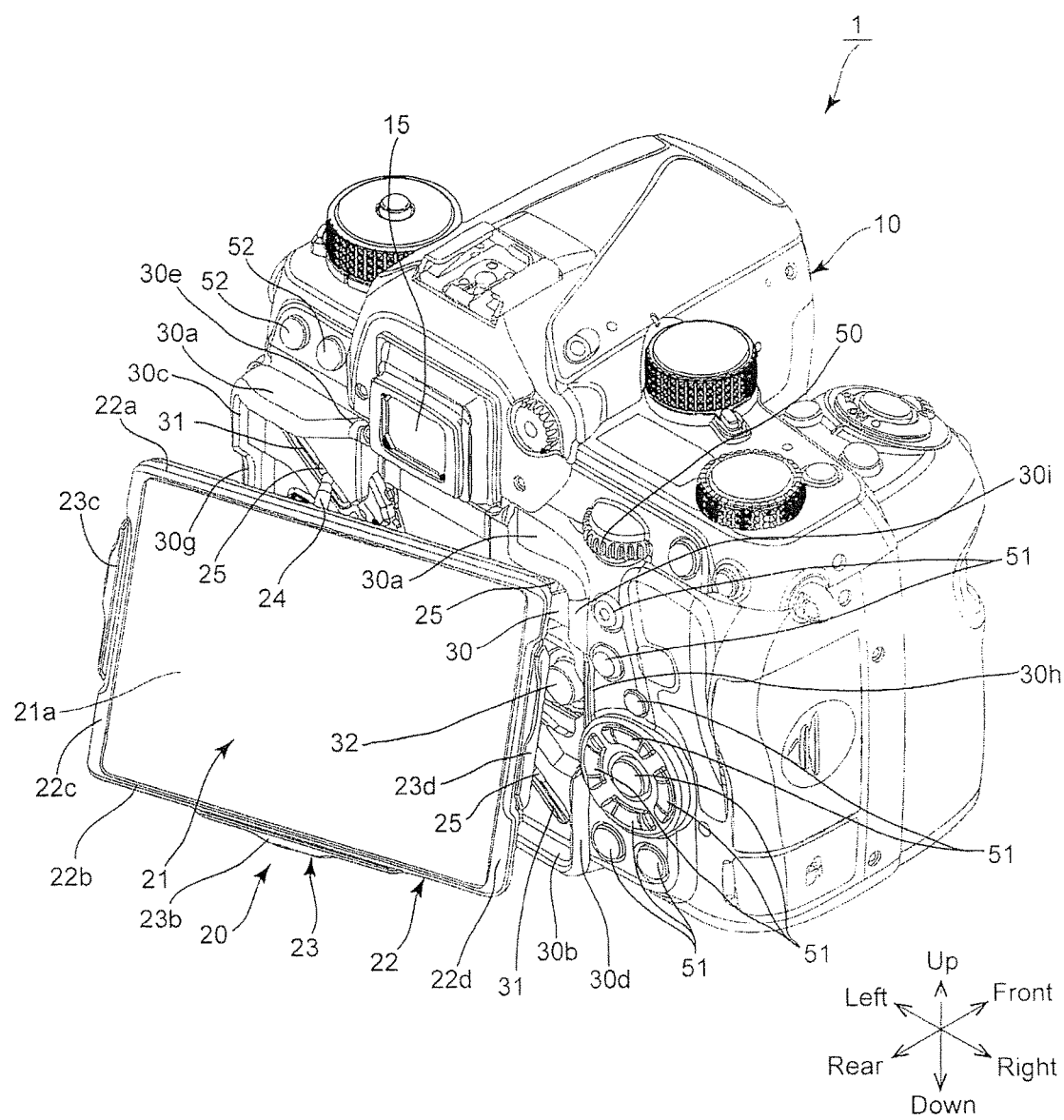
FIG. 8 is a rear perspective view of the SLR camera with the movable monitor tilted diagonally to the upper right.
Figure 9:
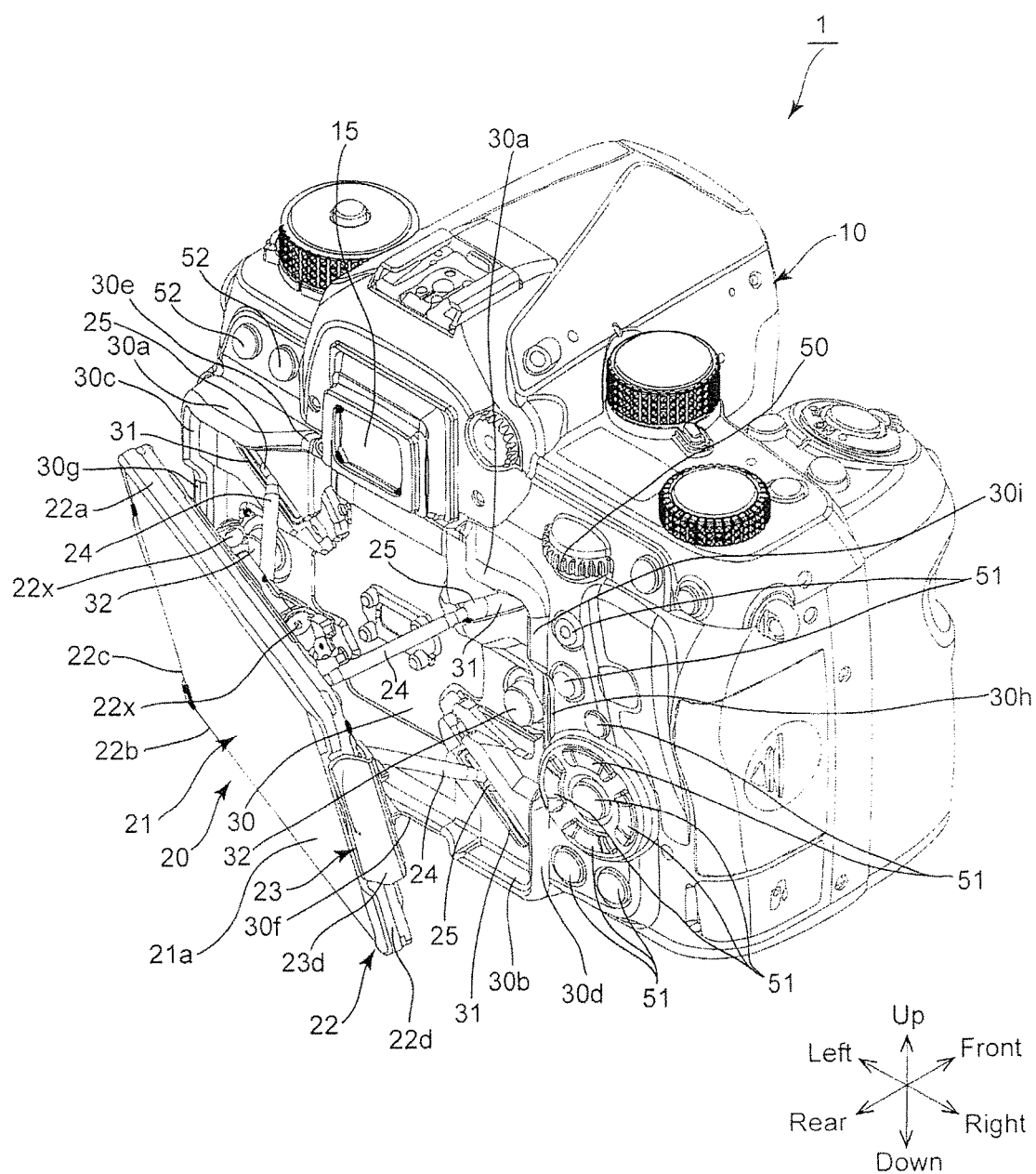
FIG. 9 is a rear perspective view of the SLR camera with the movable monitor tilted diagonally to the lower left.

When the movable monitor 20 is positioned close to the camera body 10 and accommodated in the monitor accommodating portion 30 (i.e., when the movable monitor 20 is in the initial position), the movable monitor 20 can be tilted about any of the axes extending in specific directions such as the upward and downward directions and the leftward and rightward directions as described above. This tilting of the movable monitor 20 shall be herein referred to as a first way of tilting. In addition to the first way of tilting, the movable monitor 20 can be pulled out from the monitor accommodating portion 30 rearwardly in the optical axis direction (in a direction along the imaginary line O' that is extended from the optical axis O) to be spaced from the camera body 10 as shown in FIGS. 7 and 11. This pull-out operation of the movable monitor 20 is performed by increasing the rising angles (projecting amounts) of the four support rods 24 relative to the monitor accommodating portion 30. For instance, the movable monitor 20 can be brought into the state shown in FIGS. 7 and 11 by moving the movable monitor 20 substantially parallel to itself along the optical axis O, i.e., moving the movable monitor 20 without tilting the movable monitor 20 (while maintaining the reference angle thereof), from the initial position (shown in FIG. 1) so that the four support rods 24 project by substantially the same amount from the monitor accommodating portion 30.

In a state where the movable monitor 20 is rearwardly pulled away from the monitor accommodating portion 30 to be spaced from the camera body 10, the movable monitor 20 can move without being restricted by the upper edge wall 30a, the lower edge wall 30b, the left edge wall 30c and the right edge wall 30d of the monitor accommodating portion 30. Accordingly, the movable monitor 20 can be freely tilted in any arbitrary direction, i.e., without the tilting operation of the movable monitor 20 being limited by rotation axes in specific directions such as the upward and downward directions and the leftward and rightward directions as shown in FIGS. 2 through 6. For instance, the movable monitor 20 can be tilted in directions such as the upper right direction shown in FIG. 8, the lower left direction shown in FIG. 9, the upper left direction that is laterally opposite in direction to the direction shown in FIG. 8 and the lower right direction that is laterally opposite in direction to the direction shown in FIG. 9, and the tilt angle of the movable monitor 20 can be arbitrarily set within a range in which each of the four support rods 24 can follow. This tilting of the movable monitor 20 that is flexible in tilting direction shall be herein referred to as a second way of tilting. In the second way of tilting, tilting of the movable monitor 20 in the horizontal and vertical directions (the long-side direction and the short-side direction of the display screen) is also possible, similar to the first way of tilting. Additionally, it is also possible to move the movable monitor 20 in directions orthogonal to the optical axis O while maintaining the reference angle within a predetermined range in which each of the four support rods 24 can follow in a state where the movable monitor 20 is pulled out rearwardly by an amount smaller than the maximum amount.

Figure 10:
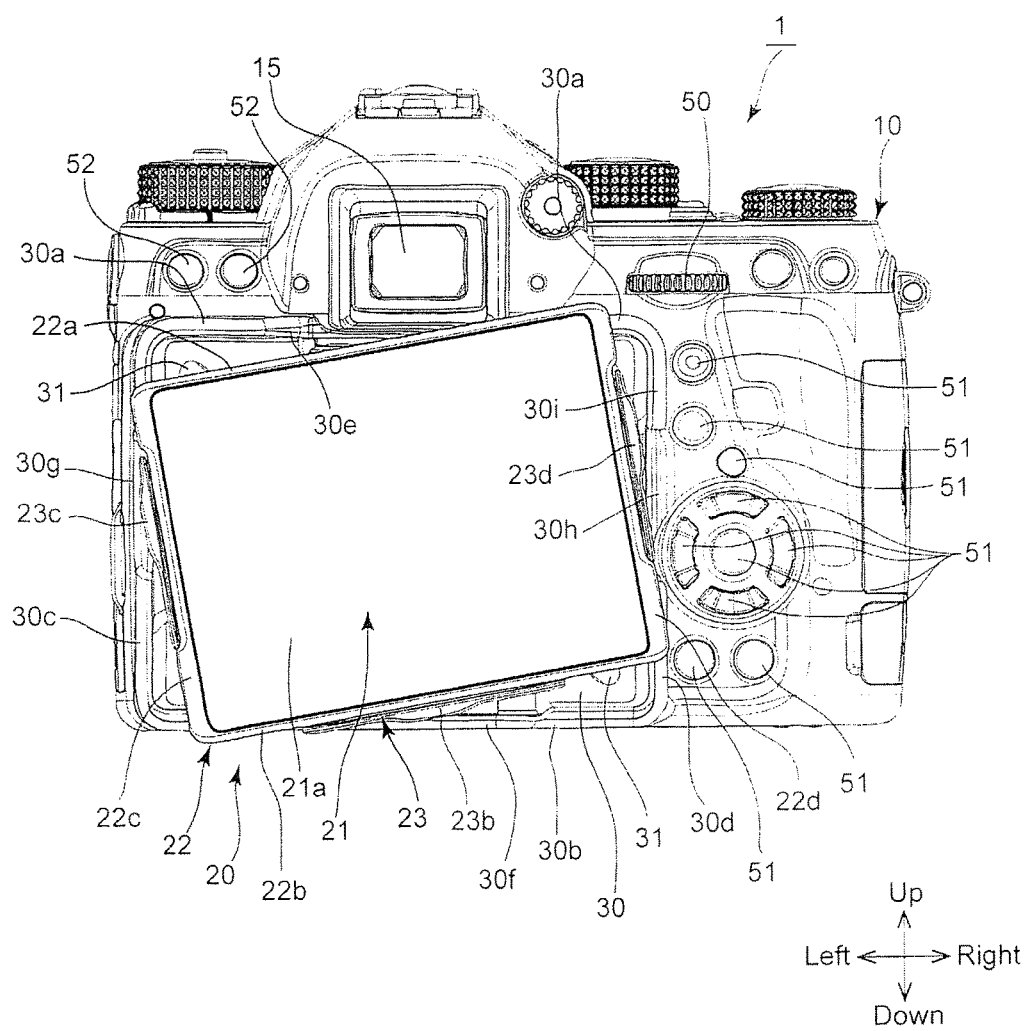
FIG. 10 is a rear elevational view of the SLR camera with the movable monitor rotated (counterclockwise with respect to FIG. 10) about an axis (imaginary line) extended from the optical axis of an interchangeable lens mounted to the camera body.

In a state where the movable monitor 20 is pulled out rearwardly from the monitor accommodating portion 30, the movable monitor 20 can also be rotated about the imaginary line O' (an axis extending in a direction in which the movable monitor 20 can move toward and away from the camera body 10), which is extended from the optical axis O, within a range in which each of the four support rods 24 can follow as shown in FIG. 10. FIG. 10 shows a state where the movable monitor 20 is rotated counterclockwise as viewed from the user's side (i.e., as viewed from the rear of the camera 1). The movable monitor 20 can also be rotated in the opposite rotation direction, i.e., clockwise as viewed from the user's side. Since the center (with respect to the outer profile) of the movable monitor 20 substantially lies on the imaginary line O', which is extended from the optical axis O, a configuration in which the imaginary line O', which is extended from the optical axis O, passes through a point that is off-center from said center of the movable monitor 20 is also possible. In such a case, the center of the outer shape of the movable monitor 20 is not coincident with the rotation center of the movable monitor 20.

As described above, in the present embodiment of the camera 1, the flexibility in setting the position of the movable monitor 20 relative to the camera body 10 is high. When the movable monitor 20 is in the initial position, in which the movable monitor 20 is accommodated in the monitor accommodating portion 30, the movable monitor 20 can be tilted in four directions: up, down, left and right, as the aforementioned first way of tilting. In a state where the movable monitor 20 has been moved rearwardly in the optical axis direction from the initial position (in a direction away from the camera body 10), the movable monitor 20 can be freely tilted with no restrictions on rotation direction as the aforementioned second way of tilting.

The reference angle of the movable monitor 20 (at which the screen of the display 21 is substantially orthogonal to the imaginary line O' that is extended from the optical axis O) when the movable monitor 20 is allowed to perform the first way of tilting is shown in FIG. 1, and the reference angle of the movable monitor 20 when the movable monitor 20 is allowed to perform the second way of tilting is shown in FIGS. 7 and 11. In either case, the position of the movable monitor 20 where the display 21 is angled at the reference angle shall be referred to as the stand-by position of the movable monitor 20. In either of the first and second ways of tilting, the tilting direction of the movable monitor 20 can be changed directly from an arbitrary tilting direction to a subsequent arbitrary tilting direction rather than via (without first moving to) the stand-by position (shown in FIGS. 1, 7 and 11). For instance, in the first way of tilting, the orientation of the movable monitor 20 can be changed from the tilt position shown in FIG. 2 or 3 to the tilt position shown in FIG. 4 or 5 (or from the tilt position shown in FIG. 4 or 5 to the tilt position shown in FIG. 2 or 3) rather than via the stand-by position shown in FIG. 1. Likewise, in the second way of tilting, the orientation of the movable monitor 20 can be changed between tilt positions in the upward, downward, leftward and rightward directions rather than via the stand-by position shown in FIGS. 7 and 11. In addition, in the second way of tilting, the orientation of the movable monitor 20 can be changed also in oblique directions such as the upper right direction shown in FIG. 8, the lower left direction shown in FIG. 9, the upper left direction that is laterally opposite in direction to the direction shown in FIG. 8 and the lower right direction that is laterally opposite in direction to the direction shown in FIG. 9, without first moving to the stand-by position shown in FIGS. 7 and 11. As can be understood from the above descriptions, the movable monitor 20 can be tilted directly in various directions without via the stand-by position, which makes it possible to change the orientation of the movable monitor 20 to a desired orientation in a quick manner, thus improving the operability of the movable monitor 20.

Additionally, in either of the first and second ways of tilting, when the movable monitor 20 is tilted, the movable monitor 20 substantially remains within a range not protruding from the outer profile of the camera body 10 as viewed in the direction of the optical axis O (the optical axis direction) as shown in FIG. 10, which makes it possible to prevent an increase in size of the camera 1 (specifically in the upward, downward, leftward and rightward directions that are orthogonal directions to the optical axis O).

In addition, the angle of the movable monitor 20 can be increased in a predetermined direction (specifically the upward direction in the present embodiment of the camera) by rotating the support frame 22 relative to the base plate 23 to thereby be capable of dealing with a larger variety of picture taking postures.

Additionally, if the movable monitor 20 is moved rearward in the optical axis direction (in a direction away from the camera body 10) from the initial position, the movable monitor 20 can rotate about the optical axis O as shown in FIG. 10, which increases the flexibility in setting the position of the movable monitor 20 relative to the camera body 10.

Each of the above described tilting and rotation of the movable monitor 20, except the tilting (rotation) of the movable monitor 20 shown in FIG. 6, is performed without substantially changing the relative positional relationship between the center of the outer profile of the movable monitor 20 and the optical axis O (the imaginary line O' extending from the optical axis O) (with the display screen 21a of the display 21 remaining positioned on the imaginary line O'), and the movable monitor 20 does not largely deviate from the outer profile of the camera body 10 as viewed along the optical axis O, thereby facilitating a photographic operation such as an operation to determine the composition. In addition, since the movable monitor 20 is accommodated in the monitor accommodating portion 30 when in the initial position, and is pulled out as needed, the size of the camera 1 in the optical axis direction when the movable monitor 20 is in the initial position (shown in FIG. 1) can be minimized.

Although the present invention has been described based on the above illustrated embodiment, the present invention is not limited solely thereto. For instance, although the angle of the movable monitor 20 in the upward direction largely varies by a rotation of the support frame 22 relative to the base plate 23 in addition to a variation in angle of the movable monitor 20 which applied by using the four support rods 24 in the above illustrated embodiment of the movable monitor 20, the two-stage variations of the angle of the movable monitor 20 can also be achieved in a different tilting direction other than the upward tilting direction. In addition, it is possible to modify the camera 1 such that the movable monitor 20 can be moved with a different support mechanism for the movable monitor 20 which consists solely of the support rods 24, i.e., with omission of the structure allowing the support frame 22 to rotate relative to the base plate 23 (i.e., with the support frame 22 and the base plate 23 formed integral with each other).

Although the movable monitor 20 of the above illustrated embodiment of the camera 1 is equipped with the display 21 having a horizontally-elongated (landscape-orientated) screen, the present invention can also be applied to a type of imaging apparatus equipped with a display screen having a different shape such as a square display screen. Additionally, the shape of the display screen (21a) is not limited solely to a rectangular shape and can be a triangular shape, a quadrangular shape other than a rectangular shape, a polygonal shape having more than four vertices, or a curved shape having no vertex, etc.

Instead of a type of displayer like the movable monitor 20 of the above illustrated embodiment of the camera 1, in which the display 21 is fixedly mounted on the support frame 22, a type of displayer in which a separate display (e.g., a smartphone or the like) that is provided separately from the support frame 22 is detachably attached to the support frame 22 can be adopted. Either a normal display having only a display function or a touchscreen display that the user can control an in-built processor (CPU, etc.) by touching the screen can be adopted as a display of a displayer.

The above illustrated embodiment of the camera 1 is a lens-interchangeable SLR camera; however, an imaging apparatus to which the present invention is applied is not limited to a lens-interchangeable SLR camera; the present invention can also be applied to a still camera other than a lens-interchangeable SLR camera (e.g., a compact camera) or a camcorder used mainly for recording moving images. Since the camera angle is often changed during photographing, especially during video taking, an imaging apparatus according to the present invention that is equipped with a displayer having a high degree of flexibility in setting the position thereof is advantageously used for taking videos (filming).

The present invention is also applicable to the following apparatuses, as electronic apparatuses equipped with an image display capable of moving relative to a body of the apparatus, other than imaging apparatuses: laptop personal computers, mobile electronic apparatuses such as tablet computers and smartphones, automotive navigation systems, testers such as oscilloscopes, etc.

Obvious changes may be made in the specific embodiment of the present invention described herein, such modifications being within the spirit and scope of the invention claimed. It is indicated that all matter contained herein is illustrative and does not limit the scope of the present invention.

What is claimed is:
1. An electronic apparatus comprising:
a body; and
a displayer provided with a display screen, said displayer comprising:
   a first support stage that supports said displayer and is configured to tilt said displayer relative to said body; and
   a second support stage that is rotatable relative to said first support stage and configured to increase a tilting angle of said displayer relative to said first support stage and said body in at least one direction,
wherein said displayer is configured with said first support stage to be selectively set at different positions including a stand-by position and a plurality of tilt positions, at which said display screen tilts in different directions relative to an orientation of said displayer set at said stand-by position, and
wherein said displayer is configured with said first support stage to be selectively movable directly to said plurality of tilt positions rather than via said stand-by position.

2. The electronic apparatus according to claim 1, wherein said display screen of said displayer is rectangular in shape, and
wherein said displayer is tiltable in at least a long-side direction and a short-side direction of said rectangular display screen.

3. The electronic apparatus according to claim 1, wherein said displayer is tiltable in at least three directions.

4. The electronic apparatus according to claim 1, wherein said displayer is tiltable in said different directions at different angles from said stand-by position.

5. The electronic apparatus according to claim 1, wherein said body comprises an image sensor,
wherein said display screen of said displayer is configured to display an image obtained by said image sensor, and
wherein said displayer is tiltable in said different directions relative to said body while remaining positioned on a line extended from an optical axis of a light bundle incident on said image sensor.

6. The electronic apparatus according to claim 1, wherein said body comprises an image sensor,
wherein said displayer is movable in directions toward and away from said body,
wherein said displayer is configured to perform, when said displayer is positioned close to said body, a first way of tilting in which said displayer is tiltable relative to said body while rotating about an axis extending in a specific direction substantially orthogonal to said directions, and
wherein said displayer is configured to perform, when said displayer is at a position spaced apart from said body, a second way of tilting in which said displayer is tiltable relative to said body in any arbitrary tilting direction.

7. The electronic apparatus according to claim 6, wherein said directions, in which said displayer is movable toward and away from said body, are parallel with directions along a line extended from an optical axis of a light bundle incident on said image sensor.

8. The electronic apparatus according to claim 6,
wherein said displayer is configured to be tilted in more than one tilting direction to perform said first way of tilting via a reference angle of said displayer at which the display screen thereof lies substantially orthogonal to an optical axis of a light bundle incident on said image sensor, and
wherein said displayer is configured to be directly tilted in different tilting directions to perform said second way of tilting rather than via said reference angle.

9. The electronic apparatus according to claim 6,
wherein when said first way of tilting is performed, a portion of said displayer is in contact with said body serving as a fulcrum.

10. The electronic apparatus according to claim 9,
wherein said displayer has a substantially rectangular outer shape,
wherein said body comprises an abutment portion against which each of four sides of said rectangular displayer are abuttable, and
wherein said displayer is configured to be selectively tilted in four directions with said four sides of said rectangular displayer so as to abut against said abutment portion, serving as four fulcrums, respectively, to perform said first way of tilting.

11. The electronic apparatus according to claim 6,
wherein said displayer is configured to rotate about an axis extending along said directions when said displayer is at a position spaced apart from said body, in which said displayer is movable toward and away from said body.

12. An electronic apparatus comprising:
a body; and
a displayer provided with a display screen, said displayer being supported by said body via a support mechanism to be movable relative to said body, said support mechanism comprising:
a first support stage that supports said displayer and is configured to tilt said displayer relative to said body; and
a second support stage that is rotatable relative to said first support stage and configured to increase a tilting angle of said displayer relative to said first support stage and said body in at least one direction,
wherein said first support stage is configured to allow said displayer to be selectively set at different positions including a stand-by position and a plurality of tilt positions, at which said display screen tilts in different directions relative to an orientation of said displayer set at said stand-by position, and
wherein said first support stage is configured to allow said displayer to be selectively moved directly to said plurality of tilt positions rather than via said stand-by position.

13. An imaging apparatus comprising:
a body provided with an image sensor; and
a displayer provided with a display screen configured to display an image obtained by said image sensor, said displayer comprising:
a first support stage that supports said displayer and is configured to tilt said displayer relative to said body; and
a second support stage that is rotatable relative to said first support stage and configured to increase a tilting angle of said displayer relative to said first support stage and said body in at least one direction,
wherein said displayer is configured with said first support stage to be selectively set at different positions including:
a stand-by position at which said display screen is positioned on an extension line of an optical axis of a light bundle incident on said image sensor and is oriented substantially orthogonal to said optical axis; and
a plurality of tilt positions at which said display screen tilts in different directions relative to an orientation of said displayer set at said stand-by position while remaining positioned on said extension line, and
wherein said displayer is selectively movable to said plurality of tilt positions rather than via said stand-by position.

14. The imaging apparatus according to claim 13,
wherein said displayer is movable in directions toward and away from said body,
wherein said displayer is configured to perform, when said displayer is positioned close to said body, a first way of tilting in which said displayer is tiltable relative to said body while rotating about an axis extending in a specific direction substantially orthogonal to said directions, and
wherein said displayer is configured to perform, when said displayer is at a position spaced apart from said body, a second way of tilting in which said displayer is tiltable relative to said body in any arbitrary tilting direction.

15. The imaging apparatus according to claim 14,
wherein said directions, in which said displayer is movable toward and away from said body, are parallel with directions along said extension line of said optical axis.

16. The imaging apparatus according to claim 14,
wherein said displayer is configured to be tilted in more than one tilting direction to perform said first way of tilting via a reference angle of said displayer at which said display screen thereof lies substantially orthogonal to said optical axis, and
wherein said displayer is configured to be directly tilted in different tilting directions to perform said second way of tilting rather than via said reference angle.

17. The imaging apparatus according to claim 14,
wherein, when performing each of said first way of tilting and each said second way of tilting, said displayer substantially remains within a range not protruding from an outer shape of said body as viewed along said optical axis.

18. The electronic apparatus according to claim 6, wherein when said displayer performs said first way of tilting, a side portion of said second support stage of said displayer is in contact with an inner side of a displayer accommodating portion of said body, said inner side of said displayer accommodating portion serving as a fulcrum to perform said first way of tilting.

19. The imaging apparatus according to claim 12, wherein said displayer is supported to be movable in directions toward and away from said body,
wherein said displayer is configured to perform, when said displayer is positioned close to said body, a first way of tilting in which said displayer is tiltable relative to said body while rotating about an axis extending in a specific direction substantially orthogonal to said directions, and when said displayer performs said first way of tilting, a side portion of said second support stage of said displayer is in contact with an inner side of a displayer accommodating portion of said body, said inner side of said displayer accommodating portion serving as a fulcrum to perform said first way of tilting.

20. The imaging apparatus according to claim 14, wherein when said displayer performs said first way of tilting, a side portion of said second support stage of said displayer is in contact with an inner side of a displayer accommodating portion of said body, said inner side of said displayer accommodating portion serving as a fulcrum to perform said first way of tilting.

\* \* \* \* \*